No. 745,451. PATENTED DEC. 1, 1903.
I. E. MILLER.
COOKER.
APPLICATION FILED DEC. 26, 1902.
NO MODEL.

Witnesses
Samuel C. Banning
Walker Banning

Inventor
Isaac E. Miller
By Banning & Banning
Atty's.

No. 745,451. Patented December 1, 1903.

UNITED STATES PATENT OFFICE.

ISAAC E. MILLER, OF CHICAGO, ILLINOIS.

COOKER.

SPECIFICATION forming part of Letters Patent No. 745,451, dated December 1, 1903.

Application filed December 26, 1902. Serial No. 136,615. (No model.)

*To all whom it may concern:*

Be it known that I, ISAAC E. MILLER, a citizen of the United States, residing at Chicago, county of Cook, and State of Illinois, have invented a certain new and useful Improvement in Cookers, of which the following is a specification.

This invention relates to a construction of cooker so arranged that it may serve in several capacities, being simple in construction and compact in form and at the same time strong and durable. It may be used as a grid for toasting bread or as a receptacle for roasting meats, potatoes, or other articles of food.

Figure 1:
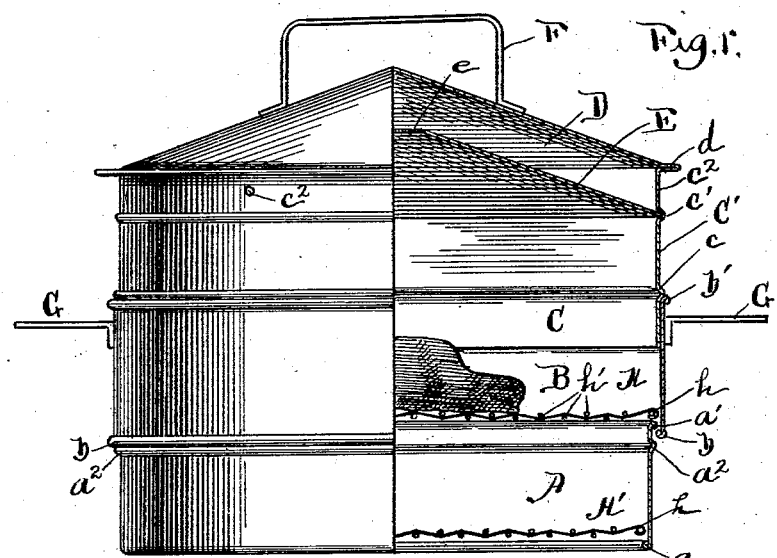
Figure 2:
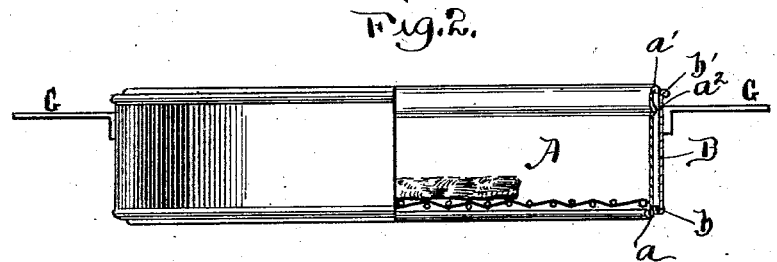
Figure 3:
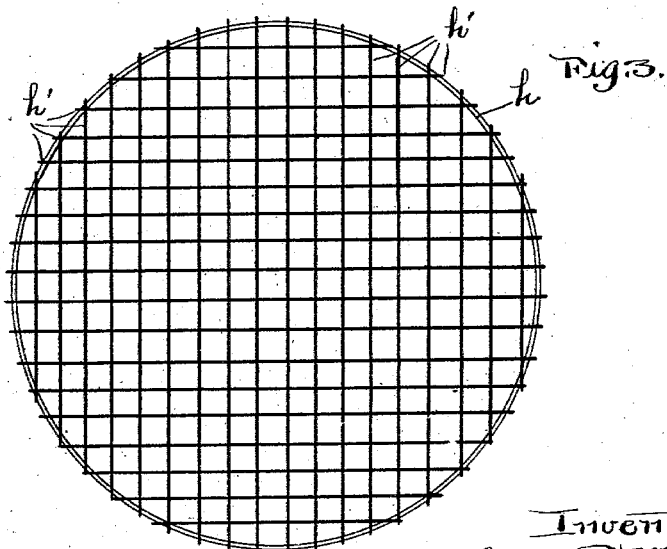

In the drawings, Figure 1 is an elevation, partly in section, of the cooker, showing the same used as a roaster; Fig. 2, an elevation, partly in section, of two sections of the cooker used as a toasting-grid; and Fig. 3 a plan view of one of the grids.

The cooker as preferably constructed consists of three main sections so arranged as to fit one within the other. The body of the cooker consists of sections A and B, which are arranged to telescope one within the other, if so desired, as shown in Fig. 2. The inner and lower section A is provided on its lower edge with an inwardly-turned annular flange or rim $a$ and on its upper edge with an outwardly-turned annular flange or rim $a'$, below which is preferably formed a bead $a^2$, encircling the section. The outer section B is likewise provided at its lower edge with an inwardly-turned annular flange or rim $b$ and on its upper edge with an outwardly-turned annular flange or rim $b'$, and the section B is of a diameter somewhat larger than the section A, so that the section B may under pressure be slipped down over the bead $a^2$ on the lower section, telescoping the two sections, as shown in Fig. 2.

The two sections composing the body of the cooker have their tops inclosed by a cover C, which consists of a circular wall $C'$, provided with an outwardly-turned bead $c$, which prevents the cover from being forced down too deeply into the section B of the body, and further provided with an outwardly-turned bead $c'$, above which in the wall are a series of holes $c^2$, whose function will hereinafter appear. The walls are covered by a cap or top D, terminating in an apex and forming at the point of juncture with the wall $C'$ a shoulder $d$. This cap or top may be formed integral with the walls composing the entire cap or united thereto in any suitable manner. Within the cap or cover, and at a suitable distance below the top thereof, is a cross-wall E, whose plane is preferably parallel to the top of the cap or cover and provided at its apex with an opening $e$ immediately beneath the apex of the top. This makes, in effect, a double roof for the cooker and leaves a space for the circulation of air, which adds greatly to the efficiency of operation of the entire device. The cap or cover is provided with a handle F, and the body-section B is preferably provided with two handles G, one on each side.

Within the cooker are two grids or screens H and H', the former being of slightly-larger diameter than the latter. The grid H is located within the body-section B and resting upon the top rim of the section A, and the grid H' is located within the section A and rests on the inwardly-turned flange or rim $a$. Each of the grids H and H' is formed with a circular rim $h$, of stiff wire or other formation, from which extend transversely a series of wires $h'$ at right angles to one another. The particular construction of the grids, however, is immaterial, provided they be made of the proper size and strength to perform the work intended.

In use as a roaster the sections composing the body are drawn apart and both grids inserted into place, after which the article to be roasted is placed upon the upper grid, which leaves a space of several inches between the fire below the lower grid and the article to be roasted on the upper grid. The cover is of sufficient size to provide for the reception of a large article, and a circulation is maintained throughout the entire cooker by means of the suction caused by the presence of the air-chamber in the cap or cover and the vent-holes $c^2$ in the wall. This circulation causes the hot air to pass up easily and evenly around the article roasting, but is not sufficiently strong to carry away the juices or flavors of the article, by which arrangement a thorough, even, and rapid roasting is effected, and a saving of time and fuel is made. In fact, the remarkable saving of fuel is one of the most important characteristics of this invention, for the reason that all the heat is carried up through the cooker by reason of the thorough circulation therein, whereas in the old style of cookers the dead air within the cooker prevented the passage of freshly-heated air thereinto, so that the application of a much larger amount of heat to the outside of the cooker was necessary than in the present invention.

When it is desirable to use the cooker as a toasting-grid, the cap or cover and the grid H are removed, and the two sections composing the body are telescoped together, as shown in Fig. 2, and in this manner a toasting-grid provided with two handles is had without the necessity for altering in any particular the construction of the parts.

I claim—

1. In a cooker, a body composed of two open sections, one telescoping into the other, a handle on the outer section and a grid within the inner section, substantially as described.

2. In a cooker, a body consisting of two open sections, one telescoping into the other, a handle on the outer section, a grid within the inner section, and a cover fitting onto the outer section, substantially as described.

3. In a cooker, a body consisting of two open sections, one telescoping into the other, a handle on the outer section, two grids, one within the inner section and the other supported on the top thereof, and a cover fitting onto the outer section, substantially as described.

4. In a cooker, a body consisting of two sections, one telescoping into the other, a handle on the outer section, a grid within the inner section, and a cover fitting onto the outer section provided with air-holes in its side walls and provided with a cross-wall having an opening therein forming a double roof and providing for the circulation of air through the cooker, substantially as described.

ISAAC E. MILLER.

Witnesses:
SAMUEL W. BANNING,
OSCAR W. BOND.